(12) United States Patent
Gatu

(10) Patent No.: US 11,750,374 B2
(45) Date of Patent: *Sep. 5, 2023

(54) SYSTEM AND METHOD FOR FORENSIC ACCESS CONTROL

(71) Applicant: Micro Systemation AB, Stockholm (SE)

(72) Inventor: Örjan Gatu, Stockholm (SE)

(73) Assignee: Micro Systemation AB

( * ) Notice: Subject to any disclaimer, the term of this patent is extended or adjusted under 35 U.S.C. 154(b) by 354 days.

This patent is subject to a terminal disclaimer.

(21) Appl. No.: 16/938,330

(22) Filed: Jul. 24, 2020

(65) Prior Publication Data

US 2020/0374108 A1 Nov. 26, 2020

Related U.S. Application Data

(63) Continuation of application No. 16/079,220, filed as application No. PCT/EP2017/054163 on Feb. 23, 2017, now Pat. No. 10,735,187.

(30) Foreign Application Priority Data

Feb. 25, 2016 (EP) ..................................... 16157334

(51) Int. Cl.
| | |
|---|---|
| *H04L 9/08* | (2006.01) |
| *H04L 9/40* | (2022.01) |
| *G06F 21/60* | (2013.01) |
| *H04L 9/30* | (2006.01) |

(52) U.S. Cl.
CPC .......... *H04L 9/0825* (2013.01); *G06F 21/602* (2013.01); *H04L 9/0897* (2013.01); *H04L 9/3073* (2013.01); *H04L 63/062* (2013.01)

(58) Field of Classification Search
CPC ....... H04L 9/08; H04L 9/0825; H04L 9/0897; H04L 9/3073; H04L 63/062; G06F 21/602
See application file for complete search history.

(56) References Cited

U.S. PATENT DOCUMENTS

| | | | |
|---|---|---|---|
| 8,990,583 B1* | 3/2015 | McEachron | ............ G06F 21/602 |
| | | | 713/193 |
| 9,703,965 B1* | 7/2017 | Robinson | ............... H04L 63/123 |
| 9,735,962 B1 | 8/2017 | Yang et al. | |
| 10,148,433 B1* | 12/2018 | Lozin | ....................... G06F 21/31 |
| 2005/0102523 A1 | 5/2005 | Harrison et al. | |
| 2006/0182277 A1* | 8/2006 | Sandhu | ................. H04L 9/3297 |
| | | | 380/44 |

(Continued)

*Primary Examiner* — Shanto Abedin
(74) *Attorney, Agent, or Firm* — Condo Roccia Koptiw LLP

(57) ABSTRACT

Described herein are methods and devices for forensic access control of an electronic device, including encryption and decryption of access keys of an electronic device. Two pairs of asymmetric key pairs (AKP) are created, e.g., created by more than one organization. An encrypted access key is configured to be decrypted by another organization possessing the private key of the first AKP and the private key of the second AKP. In some embodiments, the private key of the second AKP is encrypted. The encrypted private key of the second AKP is configured to be decrypted using the private key of the first AKP. The encrypted access key may be decrypted using the decrypted private key of the second AKP.

18 Claims, 2 Drawing Sheets

(56) References Cited

U.S. PATENT DOCUMENTS

| | | | | |
|---|---|---|---|---|
| 2006/0239452 | A1* | 10/2006 | Jung | H04L 63/101 |
| | | | | 380/44 |
| 2007/0300080 | A1* | 12/2007 | Brown | H04L 9/0894 |
| | | | | 713/193 |
| 2008/0019526 | A1* | 1/2008 | Fu | H04L 9/0822 |
| | | | | 380/277 |
| 2008/0127314 | A1* | 5/2008 | Rowley | H04L 63/123 |
| | | | | 726/5 |
| 2008/0184338 | A2* | 7/2008 | McCreight | G06F 16/24575 |
| | | | | 726/3 |
| 2009/0202081 | A1 | 8/2009 | Hammad et al. | |
| 2014/0032909 | A1* | 1/2014 | Steele | H04L 9/321 |
| | | | | 713/150 |
| 2015/0207621 | A1* | 7/2015 | Spalka | H04L 9/0836 |
| | | | | 380/44 |
| 2016/0127326 | A1* | 5/2016 | Lin | H04W 12/04 |
| | | | | 713/171 |
| 2016/0292453 | A1* | 10/2016 | Patterson | G06F 21/6245 |
| 2017/0026355 | A1* | 1/2017 | Mathaiyan | G06F 9/4856 |
| 2017/0180122 | A1* | 6/2017 | Smith | H04L 9/0822 |
| 2019/0005258 | A1* | 1/2019 | Signäs | H04L 9/3226 |

* cited by examiner

SYSTEM AND METHOD FOR FORENSIC ACCESS CONTROL

CROSS REFERENCE TO RELATED APPLICATIONS

This application is a continuation of U.S. patent application Ser. No. 16/079,220 (U.S. Pat. No. 10,735,187), which is the National Stage Entry under 35 U.S.C. § 371 of Patent Cooperation Treaty Application No. PCT/EP2017/054163, which claims priority from European Application No. 16157334.0, filed 25 Feb. 2016, the contents of each of which are hereby incorporated by reference herein in their entireties.

TECHNICAL FIELD

The present disclosure relates to a system and method for forensic access control of an electronic device.

BACKGROUND OF THE INVENTION

Technology has forever changed the world we live in. Many persons are online, in one way or another, all day long. Phones and computers are in many cases reflections of our personalities, our interests, and our identities. Such devices hold much that is important to the owner of the device. Many uses such electronic devices to communicate, e.g. via voice, text, images with the other persons or to record the events in the world around them. Evidence of such communications or recordings, in the form of data, is often needed in criminal investigations. Law enforcement agencies aren't always able to access the evidence they need to prosecute crime and prevent terrorism even with lawful authority. In many cases such agencies have the legal authority to intercept and access communications and information in the electronic devices pursuant to court order, but they often lack the technical ability to do so due to heavy encryption of the devices in question. This problem is known as "Going Dark". No development within the mobile and computer forensics industry has been as controversial as this issue.

Valid arguments have been made by both law enforcement and the technology sector. However, a solution which is acceptable to law enforcement, technology companies and privacy advocates does not exist.

Further improvements within this field are thus needed.

SUMMARY OF THE INVENTION

In view of the above, an objective of the invention is to solve or at least reduce one or several of the drawbacks discussed above. Generally, the above objective is achieved according to the attached independent patent claims.

The inventors work at a technology company that interfaces with law enforcement, and they understand and respect both sides of the discussion relating to "Going dark". The inventors believe that they have invented a cost-effective solution that is acceptable to law enforcement, technology companies and privacy advocates.

According to a first aspect, a preferred embodiment of the present invention is realized by a method for handling encryption and decryption of access keys of an electronic device, the method comprising the steps of:
creating, by a first organization, a first asymmetric key pair, AKP,
creating, by the first organization, a smart card comprising a private key of the first AKP stored in a memory of the smart card,
delivering, by the first organization, the smart card to a second organization,
receiving, by a fourth organization, a public key of the first AKP,
creating, by the fourth organization, a second AKP,
storing, by the fourth organization, a public key of the second AKP in an electronic device and configuring the electronic device to encrypt at least one access key of the electronic device using the public key of the second AKP,
encrypting, by the fourth organization, a private key of the second AKP using the public key of the first AKP,
delivering, by the fourth organization, the encrypted private key of the second AKP to a third organization,
delivering, by the third organization, the encrypted private key of the second AKP to the second organization,
decrypting, by the second organization, the encrypted at least one access key data of the electronic device by
decrypting the encrypted private key of the second AKP using the smart card comprising the private key of the first AKP,
decrypting the encrypted at least one access key of the electronic device using the decrypted private key of the second AKP.

By the term "smart card" (also known as chip card, or integrated circuit card) should, in the context of present specification, be understood a physical card (often made from plastic, generally polyvinyl chloride, but sometimes polyethylene terephthalate based polyesters, acrylonitrile butadiene styrene or polycarbonate or even paper) which can provide personal identification, authentication, data storage, and application processing. Smart cards may provide strong security authentication for single sign-on (SSO).

Although the preferred embodiment of the present invention as outlined above involves creating a smart card comprising the private key of the first AKP and delivering the smart card to a second organization, it should be understood that other means for delivering the private key of the first AKP to the second organization are also conceivable in embodiments of the present invention. Hence, the use of a smart card for this purpose is preferred but optional. Instead of using a smart card, any other type physical memory means could be used, such as disc or a memory stick. The private key of the first AKP could also be delivered to the second organization through electronic communications, for example by secure electronic mail or by means of a secure database or repository to which the private key is uploaded by the first organization and subsequently downloaded by the second organization. The skilled person will be able to devise various ways of delivering the private key of the first AKP from the first organization to the second organization.

Asymmetric encryption is a common cryptographic method that uses different keys to encrypt and decrypt data. The encryption key is made public while the decryption key is kept private. Data encrypted with the public key can only be decrypted with the private key. This encryption method is considered secure, as long as the keys are strong enough. An asymmetric key pair, AKP, is intended to encompass any suitable type of key pair comprising a private key and a public key used for encryption.

Delivering the smart card is made by physical delivery such as a courier or via a postal service etc. Delivering e.g. a key of an AKP may be done via electronic delivery such as via secure email, via a cloud service, via an external server or any other suitable ways of electronic delivery. Such delivery may also be performed via a physical delivery service as described above.

By the term "access key" should, in the context of present specification, be understood whatever access key that is needed to unlock the electronic device or its data. A pin code is for example an access key. Encryption keys internal to the electronic device and used for encrypting data of the electronic device may also be such an access key. The electronic device contains a public key (i.e. the public key of the second AKP) which is continuously used by the electronic device to encrypt the at least one access key.

It should be noted that the step of encrypting, by the fourth organization, the private key of the second AKP using the public key of the first AKP may involve several layers of encryption. For example, the private key of the second AKP may first be encrypted using a symmetric key, which then is encrypted using the public key of the first AKP. However, in any case, the private key of the second AKP is explicitly (directly) or implicitly (indirectly) encrypted using the public key of the first AKP.

The present embodiment may have one or more of the following advantages:
  Not be exploitable by Internet hackers
  Not be susceptible to mass surveillance
  Protect the privacy of users
  Be efficient for law enforcement
  Incur a minimal burden on technology companies
  Be acceptable to extend to foreign states These advantages can be summed up as tightly controlling the proliferation of electronic device unlock capabilities, while simultaneously minimizing the administrative burden for both law enforcement and manufacturers of the electronic device. This will be further explained below.

According to one embodiment, the step of receiving, by a fourth organization, a public key of the first AKP comprises the step of: delivering, by the first organization, a public key of the first AKP to the fourth organization.

According to one embodiment, the step of receiving, by a fourth organization, a public key of the first AKP comprises the steps of: delivering, by the first organization, a public key of the first AKP to the third organization and delivering, by the third organization, the public key of the first AKP, to the fourth organization. In this case it may be advantageous to let the method include the steps of delivering, by the first organization, verification data to the fourth organization, and verifying, by the fourth organization, the public key of the first AKP using the verification data prior to the step of encrypting, by the fourth organization, a private key of the second AKP using the public key received from the third organization.

According to one embodiment, the electronic device has a first and a second mode, wherein external decryption of the at least one access key of the electronic device is only possible when the electronic device is in the second mode, wherein the method further comprising the steps of: setting, by the second organization, the electronic device in the second mode prior to decrypting the encrypted at least one access key of the electronic device.

According to one embodiment, the step of setting the electronic device in the second mode requires physical access by the second organization to the electronic device.

According to one embodiment, the step of setting the electronic device in the second mode comprises at least one of: pressing a virtual or physical key of the electronic device, inputting a gesture on a touch enabled screen of the electronic device, and attaching a cable to the electronic device when booting the electronic device.

Booting of the electronic device is meant to encompass restarting a device which is turned on, or turning on a device that is turned off. Attaching a cable means inserting a cable in a socket of the electronic device.

According to one embodiment, the smart card further comprises a first and second mode, wherein the smart card is arranged to be set in a second mode by inputting activation data to the smart card, wherein the smart card is arranged to only allow decryption using the private key of the first AKP stored in the memory of the smart card if being in the second mode, the method further comprises the steps of: delivering, by the first organization, activation data for the smart card to the second organization, and inputting, by the second organization, activation data to the smart card prior to the step of decrypting the encrypted private key of the second AKP using the smart card comprising the private key of the first AKP.

According to one embodiment, the private key of the first AKP stored in the memory of the smart card is stored in an encrypted form, wherein the smart card is arranged to decrypt the encrypted private key of the first AKP when being set in the second mode.

According to one embodiment, the smart card comprises a counter for counting a number of times the smart card has been used for decrypting the encrypted private key of the second AKP, wherein the smart card is arranged to only allow decryption using the private key of the first AKP stored in the memory of the smart card if a value of the counter does not exceed a threshold number of times, wherein the step of decrypting the encrypted private key of the second AKP using the smart card comprising the steps of: incrementing, by the smart card, the value of the counter of the smart card, comparing, by the smart card, the value of the counter of the smart card to the threshold, and upon determining that the counter does not exceed the threshold, allowing decryption using the private key of the first AKP stored in the memory of the smart card.

According to one embodiment, the method further comprises the step of: upon determining that the counter exceeds the threshold, erasing, by the smart card, the private key of the first AKP from the memory of the smart card.

According to one embodiment, the first AKP is created for a specific version of an operating system, OS, of the electronic device. The OS may e.g. be iOS, Windows Phone, Android, Windows 7 etc.

In a second aspect, the present invention provides a system for handling encryption and decryption of access keys of an electronic device, the system comprises a first, second, third and fourth organization, each organization having at least one computer, wherein the at least one computer of the first organization is arranged to:
  create a first asymmetric key pair, AKP,
  store a private key of the first AKP in a manner suitable for making the private key of the first AKP available to the second organization, for example in a memory of a smart card, The at least one computer of the fourth organization is arranged to:
  receive the public key of the first AKP,
  create a second AKP,
  store a public key of the second AKP in an electronic device and configure the electronic device to encrypt at least one access key of the electronic device using the public key of the second AKP, encrypt a private key of the second AKP using the public key of the first AKP, transmit the encrypted private key of the second AKP to the at least one computer of a third organization, The at least one computer of the third organization is arranged to:

receive the encrypted private key of the second AKP from the at least one computer of the fourth organization, transmit the encrypted private key of the second AKP to the at least one computer of the second organization, The second organization has access to the private key of the first AKP, for example by means of the smart card, and to the encrypted at least one access key of the electronic device.

The at least one computer of the second organization is arranged to:

receive the encrypted private key of the second AKP from the at least one computer of the third organization, decrypt the encrypted at least one access key of the electronic device by:

decrypting the encrypted private key of the second AKP using (e.g. the smart card comprising) the private key of the first AKP, decrypting the encrypted at least one access key of the electronic device using the decrypted private key of the second AKP.

The least one computer of the second organization may be a dedicated forensic computer which may store the encrypted private key of the second AKP received directly or indirectly from the third organization as a separate key distribution or as part of a forensic product from a forensic application manufacturer. In other words, the encrypted private key of the second AKP may be stored in the computer of the second organization by means of the least one computer of the third organization.

The second aspect may generally have the same features and advantages as the first aspect.

BRIEF DESCRIPTION OF DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF THE INVENTION

A system and method for handling encryption and decryption of data in an electronic device will now be described in conjunction with FIGS. 1-2.

Figure 1:
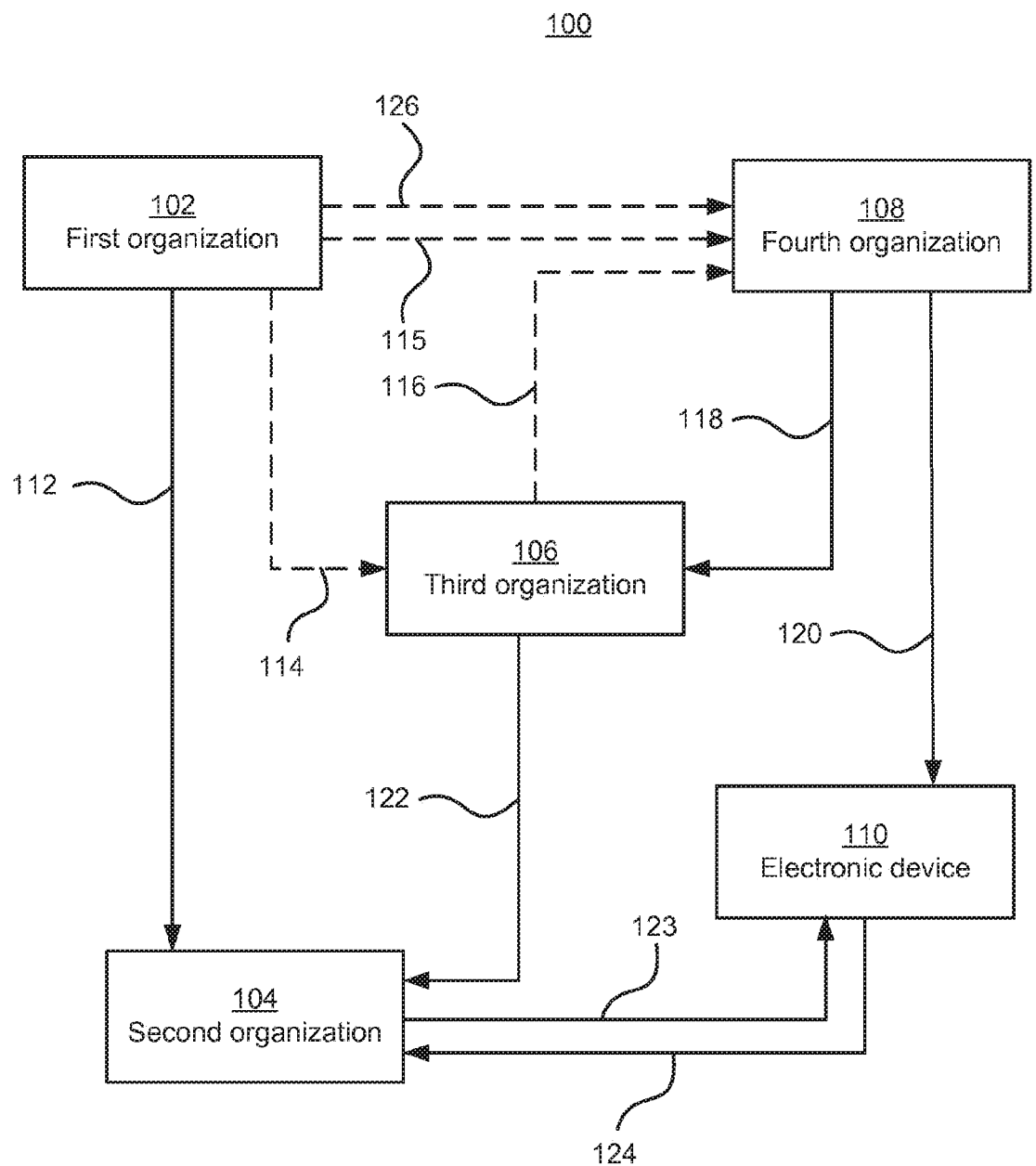
FIG. 1 shows a system for handling encryption and decryption of data in an electronic device.
Figure 2:
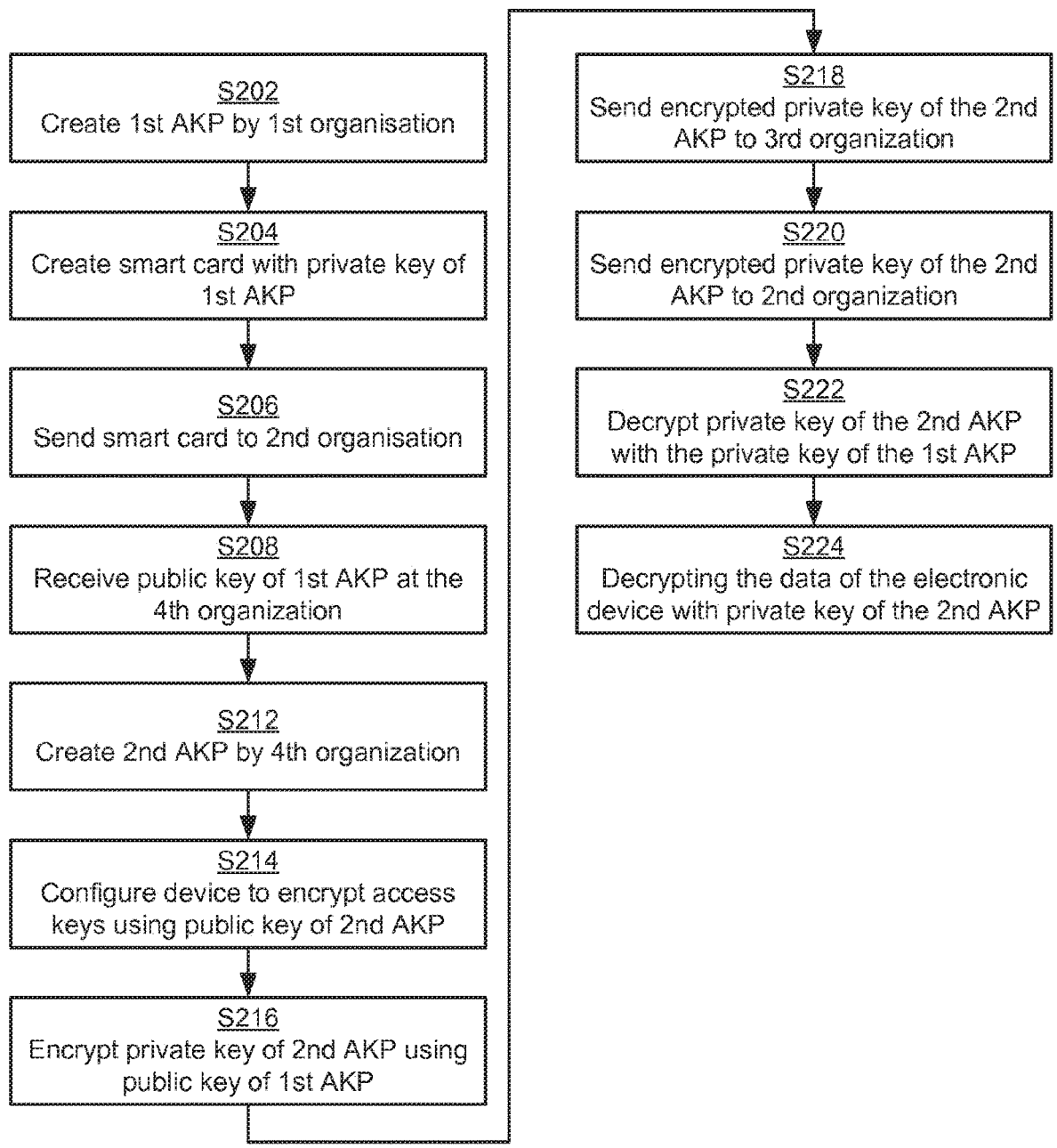
FIG. 2 shows a method for handling encryption and decryption of data in an electronic device.

FIG. 1 shows by way of example a communication schedule of a system 100 for handling encryption and decryption of access keys of an electronic device 110. The system identifies three key stakeholders, which in FIG. 1 is named first organization, second organization and fourth organization. These organizations may for example be government (first organization 102), law enforcement (second organization 104), and device manufacturers (fourth organization 108). The manufacturers create the devices, and the government authorizes law enforcement to extract data from these devices. Other organizations are also envisaged; it depends e.g. on the current politic regime where this system is implemented. For example, the UN could be the first organization.

The third organization 106 may be an external organization, trusted by the other three organizations 102, 104, 108. The purpose of the third organization 106 may be to handle the cumbersome day-to-day administration, while not being privy to any sensitive information.

In the following description, the first organization 102 is exemplified as the government, the second organization 104 is exemplified as the law enforcement agency, the third organization 108 is referred to as the Forensic Access Control Technology (FACT) system and the fourth organization 108 is exemplified as a manufacturer or a smartphone manufacturer. The electronic device 110 is exemplified as a smartphone. As described above, this is only by way of example and other organizations and electronic devices can implement the system 100.

The First Organization

The government 102 has the role of authorizing law enforcement agencies 104. For this purpose, the government creates S202 a first asymmetric key pair, AKP. The private key of the first AKP is directly distributed (sent, delivered etc.) S206, 112 from the government 102 to authorized law enforcement agencies 104. In some embodiments, this is the only key distribution that takes place outside the FACT system, e.g. not via the FACT system 106. The reason for this is that the manufacturers 108 or the FACT system 106 will never have access to the authorizing key.

To achieve maximum security, the government 102 distributes (delivers, transmits, sends etc.) 112, S206 the private key of the first AKP inside a smart card. For this reason, the government 102 will create S204 a smart card comprising a private key of the first AKP stored in a memory of the smart card. The card may contain the private key of the first AKP in a non-extractable form and may perform internal encryption and decryption of data stored in the smart card.

The public key of the first AKP, which is not sensitive, may in some embodiments be uploaded (delivered, transmitted, sent etc.) 114 into the FACT system 106 for distribution (uploading, delivering, sending, transmitting etc.) 116, S210 to smartphone manufacturers 108. In this case, the government 102 also may publish 126 information about how to verify the public key of the first AKP. In other words, the government 102 may deliver 126 verification data to the smartphone manufacturers 108, to be used for verifying the public key of the first AKP.

The public key of the first AKP may instead in some embodiments be delivered 115 directly to the smartphone manufacturers 108. In this case, no additional verification data needs to be sent to the smartphone manufacturers 108. Such a delivery 115 may be an electronic deliver, or using a smart card in the same way as described in conjunction with the delivery of the private key of the first AKP to the law enforcement agency 104.

The Smart Card

The protection offered by a properly implemented smart card makes it hard to copy the key, especially without destroying the card. The card also provides a robust mechanism for access control and auditing.

Further, the physical act of transferring S206, 112 smart cards from the government 102 to the law enforcement agency 104 removes the key transmission mechanism from the Internet where it can be attacked.

According to some embodiments, the smart card comprises a processor arranged to decrypt the encrypted private key of the second AKP using the private key of the first AKP stored in the smart card, and decrypting the encrypted at least one access key of the electronic device using the decrypted private key of the second AKP in a single internal operation in the smart card. The single internal operation may of course include several instructions performed by the processor of the smart card, but the important thing is that the private key of the second AKP is never accessible from outside the smart card during this operation. The decrypted at least one access key is then outputted from the smart card. This embodiment increases the security of the decryption operation of the access keys since the decrypted private key of the second AKP cannot leak or be extracted from the smart card during the decryption operation of the access keys.

The smart card may incorporate additional security measures such as an individual PIN code (activation data) that needs to be input for activation. In other words, the smart card may according to embodiments further have a first and second mode, wherein the smart card is arranged to be set in a second mode by inputting activation data to the smart card, wherein the smart card is arranged to only allow decryption using the private key of the first AKP stored in the memory of the smart card if being in the second mode.

The card may also contain a counter that only allows a certain number of uses (i.e. decryptions using the smart card) and which can be read for auditing purposes. This may be implemented by the smart card comprising a counter for counting a number of times the smart card has been used for decryption of an access key of an electronic device, wherein the smart card is arranged to only allow decryption using the private key of the first AKP stored in the memory of the smart card if a value of the counter does not exceed a threshold number of times.

The smart card may thus be arranged for incrementing the value of the counter of the smart card when the smart card is used for decrypting the encrypted private key of the second AKP, comparing the value of the counter to the threshold, and only allow decryption using the private key of the first AKP stored in the memory of the smart card upon determining that the counter does not exceed the threshold.

Additionally, the government 102 may request that smart cards are returned within a set period of time. If a smart card goes unaccounted for, a leak may be suspected.

In response to a possible leak, the government 102 updates its keys, issues new cards, and asks manufacturers to release a security patch of their operating systems. The government may also proactively update its keys at regular intervals.

The Fourth Organization

When a smartphone manufacturer 108 e.g. releases a new version of an OS of an electronic device (or for some other reasons wants to update the encryption of access keys of an electronic device), the manufacturer first retrieves (receives etc.) S208, 116, 115 the current public key of first AKP from the FACT system 106 or directly from the government 102. Optionally, it verifies that the key does in fact originate from the government 102 using the above mentioned verification data.

The manufacturer then creates a key pair, the second AKP. The second AKP may be specific to the OS, or specific to the version of the specific OS. The public key of the second AKP is stored in the device 110, and the device 110 is configured S214 to encrypt at least one access key of the electronic device using the public key of the second AKP. The private key is encrypted S216 with the government public key and uploaded 118, S218 to the FACT system 106 for distribution 122, S220 to law enforcement 104.

By encrypting the private key of the second AKP with the government public key (the public key of the first AKP), only organizations with a valid smart card (i.e. those who are in possession of the private key of the first AKP) can decrypt the private key of the second AKP and thereby achieve the possibility to decrypt the access key of the electronic device. The FACT system can distribute the encrypted key, but will never be able to use it.

Extraction mode capability may be added to the device as will be described below in the section relating to the electronic device 110. The implementation of an extraction mode is typically performed once per hardware platform.

The Electronic Device

The privacy and security of the electronic device (e.g. smartphone) are protected by at least one safeguard: the private key of the second AKP.

According to some embodiments, further safeguards exists, for example that external decryption of the at least one access key data of the electronic device is only possible if the electronic device is in a certain mode (second mode or extraction mode). The device must thus be set in such a mode prior to decrypting the encrypted at least one access key of the electronic device.

According to some embodiments, setting the electronic device 110 in the second mode requires physical access to the smart phone. For example, the extraction mode can only be activated by physical means when the device is started (booted). Such activation methods can include at least one of: pressing a virtual or physical key of the electronic device, inputting a gesture on a touch enabled screen of the electronic device, and attaching a cable to the electronic device when booting the electronic device. Under normal operation this mode cannot be entered. This means that a party trying to extract data must have physical control of the device. Hacker attacks over the Internet and mass surveillance is thereby rendered impossible.

Access to data in the smartphone is also protected by encryption. The smartphone contains a public key that may be unique to the operating system version. This key is continuously used by the phone itself to encrypt whatever access keys are needed to unlock the phone or its data.

A party that wants to extract data from a smartphone needs access to the phone and the corresponding private key for the operating system version. In this system 100, these keys are only made available to law enforcement 104.

The Second Organization

The second organization 104, or law enforcement agency, uses the smart card to decrypt the encrypted at least one access key of the electronic device. This is done by decrypting S222 the encrypted private key of the second AKP using the smart card comprising the private key of the first AKP, and decrypting S224 the encrypted at least one access key of the electronic device using the decrypted private key of the second AKP. The law enforcement has thus access to the smart card and also access to the encrypted private key of the second AKP, while the encrypted at least one access key of the electronic device is received 124 from the electronic device. Advantageously, physical access to the device 110 is required.

An example of the above follows now.

Law enforcement 104 installs forensic software and attaches the smart card containing the government private key (private key of the first AKP) to the same computer.

The examiner at the law enforcement agency 104 restarts the smartphone 110 and puts it into extraction mode (second mode). The smartphone 110 responds by sending out 124 the access key that is encrypted with the operating system public key (public key of the second AKP).

The forensic application receives 124 the encrypted access key from the smartphone and retrieves the corresponding encrypted private key of the second AKP from the third organization 106. According to some embodiments, the forensic application contains or has access to keys delivered from the third organization to the manufacturer of the forensic application or the law enforcement agency 104 with the encrypted private key of the second AKP already stored at the forensic application. It is advantageous if the forensic application is installed on a dedicated hardware that cannot be connected to the internet.

The encrypted keys are passed to the smart card for decryption. The smart card first decrypts the private key of the second AKP by using the private key of the first AKP. It then uses the decrypted private key of the second AKP to decrypt the at least one access key.

The decrypted at least one access key is then passed back 123 to the smart phone. The smart phone now has the information needed to unlock itself, and it proceeds to send data to the examiner.

Before returning the access key, optionally the smart card increments its usage counter. If the counter reaches the threshold, the smart card erases the private key of the first AKP from the memory of the smart card. By the feature incrementing a usage counter to meet a threshold, it is understood to also encompass decrementing the usage counter until it reaches zero.

The Third Organization

As described above, the FACT system 106 handles the cumbersome day-to-day administration of keys, while not being privy to any sensitive information. The third organization merely functions as a trusted witness for transmitting keys back and forth between the first, second and fourth organization. The third organization may optionally be arranged for storing such keys. Keys may be distributed directly to the second organization 104 or being embedded into forensic products (applications) which are then distributed to the second organization 104. In other words, the third organization 1066 may install (transmit etc.) the encrypted private key of the second AKP to a computer belonging to the second organization, or it may transmit the key to a forensic application manufacturer for inclusion in a forensic application that is then delivered to the second organization.

It should be understood, however, that although the involvement of the FACT system (the third organization) is preferred, embodiments of the present invention without such third organization are conceivable. For example, the encrypted private key of the second AKP could be delivered directly from a device manufacturer (the fourth organization) to law enforcement agencies (the second organization).

Summary of Key Facts of this System

It is believed that this system sufficiently guards the privacy of users.

A user is only exposed to data intrusion by a party that has physical control of the device, a forensic application, and a valid government authorization key on a smart card.

There is no conceivable way this system can be used for mass surveillance or Internet hacker attacks.

Even if a fully operational forensic system fell into wrong hands, it would require physical access to the phone and only be operational until the next operating system update, or until the smart card counter runs out.

Operating systems are continually updated for security reasons, and updates for leaked smart cards can be considered equivalent with any security patch.

It is also important to reiterate that the FACT system or forensic applications never actually see the authorizing key. The forensic manufacturers will never be able to extract data on their own.

None of the computers that directly uses or generates any of the private keys should be connected to the Internet to avoid any kind of attack.

Manufacturers may optionally have to do a one-time addition of an extraction mode to their devices. This is not an advanced implementation and may already partially exist for debug reasons. They will also have to create and upload keys with every operating system release. This procedure is not a substantial undertaking, especially in comparison with the complexity already managed within a normal release process.

Most importantly, manufacturers avoid risking more draconic measures that would be certain to hurt privacy, security, the technology industry, and the general society.

Governments or other similar organizations will have to generate a key pair and distribute smart cards to trusted agencies. This is a relatively small administrative task that is easily centralized.

It is believed that the proposed system strikes a working balance between privacy, security, and the legitimate need for access by law enforcement.

Implementation Details

The devices and methods disclosed hereinabove may be implemented as software, firmware, hardware or a combination thereof. For example, each of the described organizations has at least one computer used to implement the method of handling encryption and decryption of access keys of an electronic device. Implementing functions for transmitting and receiving data using such computers are straightforward to implement.

Although the steps of a method are, for reasons of clarity, listed sequentially, some or all of the steps may, if suitable, be performed in parallel. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method, comprising:
creating, by a first organization, a first asymmetric key pair (AKP) comprising a public key and a private key;
sending the public key of the first AKP to a second organization;
creating, by the second organization, a second AKP comprising a public key and a private key;
storing, in an electronic device, the public key of the second AKP; and
encrypting, at the electronic device, an access key to the electronic device using the public key of the second AKP;
wherein the encrypted access key is configured to be decrypted by a third organization possessing the private key of the first AKP and the private key of the second AKP.

2. The method of claim 1, wherein the private key of the second AKP is encrypted, and is configured to be decrypted using the private key of the first AKP.

3. The method of claim 1, wherein the encrypted access key is decrypted using the private key of the second AKP.

4. The method of claim 1, wherein the second organization does not have access to the private key of the first AKP.

5. The method of claim 1, further comprising receiving, at the second organization, verification data to be used for verifying the public key of the first AKP.

6. The method of claim 1, wherein the organization possessing the private key of the first AKP and the private key of the second AKP must also have physical access to the electronic device to decrypt the encrypted access key.

7. The method of claim 1, further comprising providing the electronic device with a first mode of operation and a second mode of operation.

8. The method of claim 7, wherein the encrypted access key can be decrypted only when the electronic device is in the second mode of operation.

9. A method, comprising:
receiving only a public key of a first asymmetric key pair (AKP) comprising the public key and a private key;
creating a second AKP comprising a public key and a private key;
configuring an electronic device to store the public key of the second AKP;
configuring the electronic device to encrypt an access key to the electronic device using the public key of the second AKP; and
configuring the electronic device such that the encrypted access key can be decrypted by an organization possessing the private key of the first AKP and the private key of the second AKP, wherein said organization did not create the private key of the first AKP and the private key of the second AKP.

10. The method of claim 9, further comprising receiving verification data to be used for verifying the public key of the first AKP.

11. The method of claim 9, wherein at least one of the first AKP and second AKP is created for a specific version of an operating system of the electronic device.

12. The method of claim 9, further comprising releasing an updated operating system for the electronic device.

13. The method of claim 9, further comprising encrypting the private key of the second AKP with the public key of the first AKP.

14. The method of claim 13, wherein the encrypted private key of the second AKP is configured to be decrypted using the private key of the first AKP.

15. The method of claim 14, wherein the encrypted access key is decrypted using the decrypted private key of the second AKP.

16. The method of claim 9, further comprising configuring the electronic device with a first mode of operation and a second mode of operation.

17. The method of claim 16, wherein the encrypted access key can be decrypted only when the electronic device is in the second mode of operation.

18. A method, comprising:
receiving only a public key of a first asymmetric key pair (AKP) comprising the public key and a private key;
receiving an encrypted private key of a second AKP comprising a public key and the private key; and
sending the encrypted private key of the second AKP to an organization possessing the private key of the first AKP, said organization needing to decrypt an encrypted access key of an electronic device, wherein the decrypting organization did not create the first AKP or the second AKP, wherein the encrypted private key of the second AKP is configured to be decrypted using the private key of the first AKP, and wherein the encrypted access key is decrypted using the private key of the second AKP.

* * * * *